June 18, 1963 J. B. BATCHELOR, JR 3,094,670
INVERSE CLIPPING CIRCUIT
Filed Oct. 9, 1959
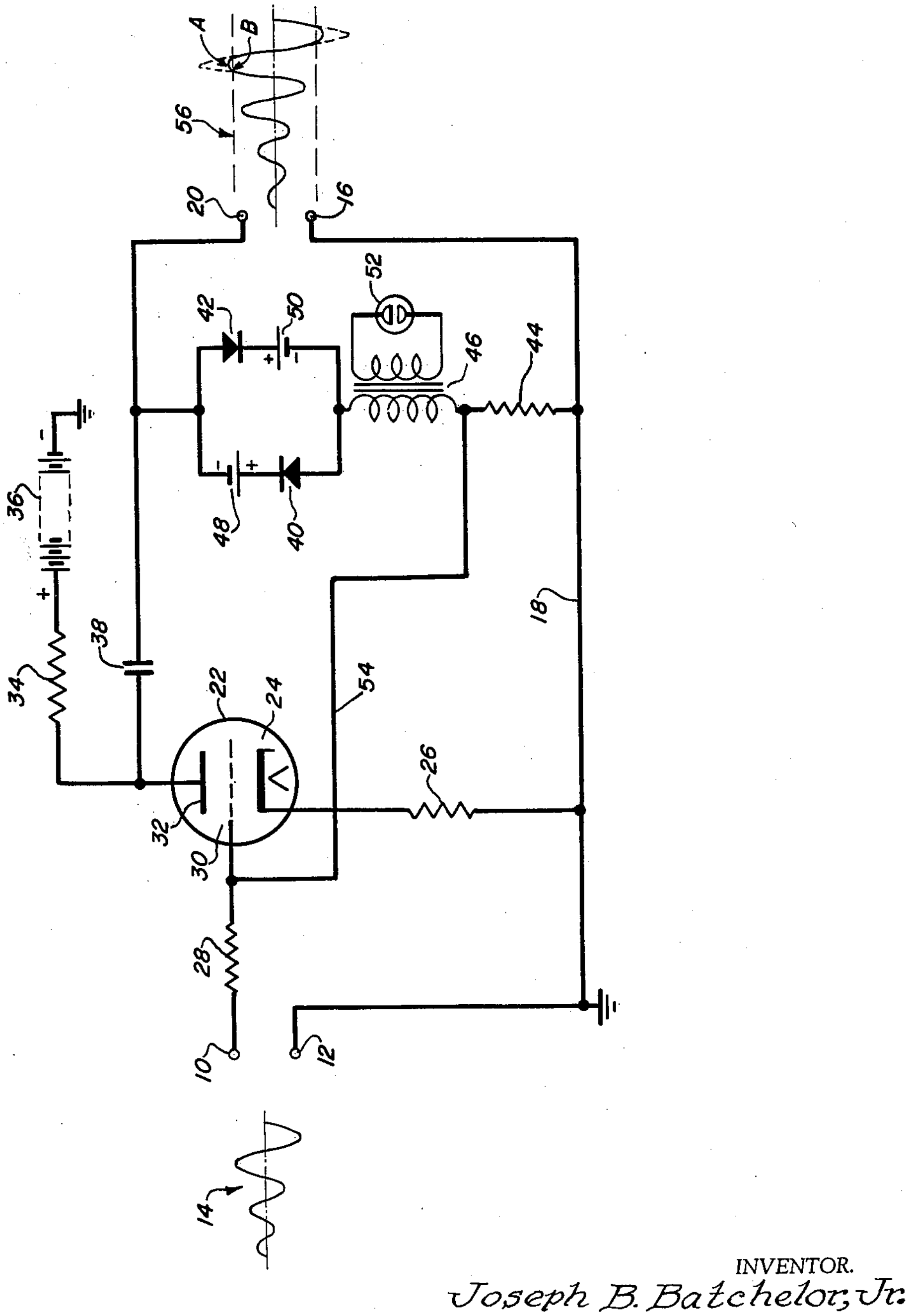
INVENTOR.
Joseph B. Batchelor, Jr.
BY Hugh H. Drake
Attorney United States Patent Office 3,094,670
Patented June 18, 1963

3,094,670
INVERSE CLIPPING CIRCUIT

Joseph B. Batchelor, Jr., Libertyville, Ill., assignor to Central Electronics, Incorporated, a corporation of Illinois Filed Oct. 9, 1959, Ser. No. 845,346
6 Claims. (Cl. 330—2)

This invention is concerned with electric signal wave modifying circuits, particularly of the symmetrical clipping or limiting type which are widely employed to restrict the instantaneous amplitude of the transmitted wave to some maximum level predetermined by considerations of design or utilization.

Circuits of the foregoing type find uses in both the transmission and reception of carrier wave intelligence, and are employed regardless of the kind of carrier modulation. Thus, in the audio frequency stages of a transmitter, momentarily excessive voltages which would drive the following stages beyond their design limits are productive of distortion, may result in the development of signal energy levels or frequency excursions beyond those desired by the user or permitted by the licensing authority, and may even lead to damage of equipment. Similarly, excessive peaks of audio energy in a wave receiver may produce overdrive of subsequent stages, and consequent distortion.

Peak clippers or limiters suitable for preventing the effects as described above are well known in the art. For many applications, however, it is highly desirable to provide such a circuit with an indicator which will inform the user, or supervisory personnel, of the state of operation of the clipping circuit. Such an indicator not only serves as a check on the operation of the clipper and prior stages, but also permits easy adjustment of the overall gain to a suitable value as, for example, in cases where a microphone or other transducer is subject to widely varying sound levels or other input energy sources.

Accordingly, it is a principal object of this invention to provide a simple and effective clipping-level indicator for clippers and limiters as described; it is a subsidiary object of the invention to provide such an indicator whose design will preclude any adverse reaction upon the normal and desired operation of the clipper circuit itself. A further object is to provide such an indicator whose adjustment is proof against accidental or unauthorized change.

Briefly, the above objects are accomplished in accordance with the invention by a peak clipping circuit for communication equipment, of the kind including a variable transmission device, and which includes input and output signal circuits for that device. Also included are means defining a current-diverting path connected only across the output circuit and including peak-voltage-sensitive means responsive only to a voltage thereacross exceeding a predetermined clipping level to effect current diversion into the path together with means responsive only to the flow of current in the path for applying a clipping control signal to the input circuit. Of essence to the improvement is a peak clipping indicator which is coupled into the current diverting path and which is directly energized only by the current flowing in that path.

The invention will best be understood from the following detailed specification of a preferred embodiment thereof, given by way of example, and taken in connection with the single FIGURE of the drawing, which is a schematic diagram of the preferred circuit.

In the drawing, numerals 10 and 12 designate input terminals to which is applied an input signal wave 14 which may typically have considerable variation in the amplitudes of individual half cycles thereof. The input terminal 12 is shown connected to an output terminal 16 by conductor 18, which may be a common return path such as the usual chassis or ground reference conductor. The other output terminal is designated by numeral 20.

The inverse peak clipper circuit itself is of a known type including an amplifier element shown as a vacuum tube triode 22 whose cathode 24 is connected to the common conductor 18 through bias resistor 26, the input signal being applied over resistor 28 between the control grid electrode 30 and cathode 24 of the tube 22. Variations in the signal input level thus control the potential of the grid 30 and thereby the space current flowing between the cathode and the plate or anode electrode 32. The latter electrode is connected through the usual load resistor 34 to a source of tube space current represented as a battery 36 whose negative terminal is returned to the common reference conductor 18. The alternating current component of variations in the tube's space current is coupled to the output terminal 20 over coupling capacitor 38, it being understood that the desired output utilization circuit or apparatus will be connected between terminals 16 and 20. Capacitor 30 also blocks the flow of direct current from source 36 through the diode circuit to be described.

Since even very short or transitory signals of excessive amplitude can over-drive or damage succeeding stages of the equipment, it is desirable that the clipping circuit be capable of responding quickly to any such excessive input signal. An effective circuit having this property is shown as including a pair of reversely connected diodes 40 and 42 connected in parallel with one another and together connected across the output terminals 16 and 20 through a resistor 44 and the primary winding of a small audio frequency transformer 46. Directly in series with the diodes are respective bias voltage sources 48 and 50, these having low internal resistance and hence being shown as batteries, though it will be understood that other equivalent biasing sources can be employed. Whatever their nature, the polarities of these two sources are reversed relative to their common connections, and they are so connected that the voltage of source 48 tends to oppose conduction through diode 40, and the voltage of source 50 opposes conduction through diode 42.

Thus, if diode 42 is poled as to conduct only when terminal 20 is positive with respect to terminal 16, source 50 is poled to prevent such conduction unless the terminal 20 is more positive than terminal 16 by an amount which exceeds the voltage of source 50. Likewise, under the assumed polarities as stated, diode 40 will conduct only when terminal 20 is more negative than terminal 16 by an amount exceeding the voltage of source 48. It follows that, with respect to the alternating voltage between 16 and 20, the clipping diode paths are effectively open-circuited unless the said voltage exceeds a predetermined level defined by the characteristics of the associated circuitry as described. For values of output voltage at which conduction is permitted, the magnitude of current flow will be in part determined by resistor 44, which serves to prevent excessive current flow through either diode. Therefore, so long as the instantaneous value of the voltage between output terminals 16 and 20 remains below a certain absolute level, such voltage will be applied to the output device or the succeeding circuitry. When this level is exceeded, however, one or the other of the diodes will conduct current in the shunt path including resistor 44, and a voltage will be developed across this resistor of a magnitude related to the extent to which the clipping level is exceeded. The potential at the upper end of resistor 44 is applied, over feedback conductor 54, to the grid electrode 30 of the tube 22, and it will be observed that this potential will always be of such polarity as to tend to counteract that grid potential change which caused the flow of current through the resistor 44.

Thus, if the input signal at terminal 10 swings grid 30 more positive, plate current in tube 22 will rise, and the plate voltage will decrease. Due to the presence of capacitor 38, terminal 20 will swing negative with respect to reference conductor 18, and if sufficiently so as to overcome the counter-bias of source 48, diode 40 will conduct (conventional) current upward in the resistor 44. Conductor 54 will thus become more negative than conductor 18, which will oppose or reduce the positive potential increase at grid 30 due to the assumed signal input. A reversely poled input cycle of sufficient amplitude will cause conduction downward in resistor 44, and again oppose the change due to the assumed negative-going input wave.

In accordance with the invention, the action of the clipping circuit is directly indicated by the illumination of signal lamp 52, connected to the secondary winding of transformer 46; lamp 52 may be a small gaseous lamp such as the well-known neon indicator. Transformer 46 serves to remove the lamp resistance from the shunt circuit and thereby prevent the clipping action from being impaired by this resistance; it also provides lamp-operating voltage step-up where required. However, so long as the signal energizing circuit is directly energized by the flow of current in the diode path, the desired stability of indication will be obtained, as contrasted with known indirectly actuated signals (e.g., controlled from an auxiliary amplifier) which may easily be mis-adjusted by the user of the equipment. It is preferred to employ the neon type of indicator lamp 52 to avoid waste of power and in view of its long life, as well as to provide instantaneous indication of individual cycle clipping.

It is especially noted that the diodes and their bias sources, together with resistor 44, provide for the direct control of symmetrical clipping over the feedback path 54, but do not operate as excess power absorbers in the manner of many double-diode limiters. Thus, small and inexpensive diodes and bias sources can be employed. In general, as will be understood, diodes 40 and 42 (and bias sources 48, 50) will be matched to provide positive and negative clipping at the same absolute magnitude level.

In a typical circuit employing the invention, the triode bias resistor 26 may have a value of about 1,500 ohms, and resistors 28 and 44 about 82 thousand ohms, for a typical triode using a load resistor 34 of 50 thousand ohms. Miniature crystal diodes such as type 1N64 or the like may be used for elements 40 and 42, and of course bias sources 48 and 50 will be chosen in accordance with the clipped output level desired. In any event, the total current drawn through the measuring path including the diodes, the transformer primary, and resistor 44 will be minute.

The use of the circuitry described, in a relatively high-impedance feedback-control circuit for sensing excessive voltage swings at the output terminals, provides rapid response fully adequate for individual peak clipping at audio frequencies and protects both the diodes and their sources against current flow sufficient to cause damage to, or shortened life of, such parts. Moreover, as compared with current-diverting diode circuits usually employed, the shape of the clipped output waves is somewhat rounded at the extremities, as at "A" in the output wave representation 56, rather than sharply flat-topped as at "B." This rounded wave is better adapted for further use or amplification without the introduction of the harmonic distortion always associated with relatively sharper transitions in the signal wave.

While the invention has been described in some detail for the benefit of those wishing to practice the same, such details are not intended to limit the invention except as may be required by the scope of the appended claims.

What is claimed is:

1. A self-indicating symmetrical peak clipper for communication equipment, comprising an amplifier having input and output terminals, means definining an output level sensing circuit connected across said output terminals and including, in series, the parallel combination of a pair of individually back-biased reversely-poled peak-sensing diode elements, one winding of an indicator transformer, and a dropping resistor; means for applying the voltage developed across said resistor to said input terminals to control said amplifier inversely with respect to output levels exceeding the threshold of said elements; and a clipping operation indicator coupled to another winding of said transformer.

2. A peak clipper in accordance with claim 1, in which said clipping operation indicator is a lamp.

3. A peak clipper in accordance with claim 1, in which said clipping operation indicator is a gaseous discharge lamp.

4. In a peak clipping circuit for communication equipment, of the kind including a variable transmission device, input and output signal circuits for said device, means defining a current-diverting path connected only across said output circuit and including peak-voltage-sensitive means responsive only to a voltage thereacross exceeding a predetermined clipping level to effect current diversion into said path, and means responsive only to the flow of current in said path for applying a clipping control signal to said input circuit, the improvement which comprises a peak clipping indicator coupled into said current-diverting path and directly energized only by current flowing in said path.

5. In a peak clipping circuit for communications equipment, of the kind including a variable gain device, input and output signal circuits for said device, means defining a current-diverting path connected only across said output circuit and including peak-voltage-sensitive means responsive only to a voltage thereacross exceeding a predetermined clipping level to effect current diversion into said path, and means responsive only to the flow of current in said path for applying a clipping control signal to said input circuit, the improvement which comprises a peak clipping indication device including a transformer having primary and secondary windings, said primary winding connected in series in said current diverting path, and a visual current-responsive indicator coupled across the secondary winding of said transformer and responsive only to energy in said path.

6. A peak clipping circuit in accordance with claim 5, in which said indicator is a gas discharge lamp.

References Cited in the file of this patent

UNITED STATES PATENTS

| | | |
|---|---|---|
| 2,340,429 | Rankin | Feb. 1, 1944 |
| 2,551,619 | McWhirter et al. | May 8, 1951 |
| 2,861,185 | Hopper | Nov. 18, 1958 |
| 2,877,346 | Weekerle | Mar. 10, 1959 |
| 2,882,522 | Pearlman | Apr. 14, 1959 |
| 2,883,615 | Gilbert | Apr. 21, 1959 |
| 2,935,697 | McManis | May 3, 1960 |

FOREIGN PATENTS

| | | |
|---|---|---|
| 874,023 | Germany | Apr. 20, 1953 |